(12) United States Patent
Yamamoto

(10) Patent No.: US 7,338,079 B2
(45) Date of Patent: Mar. 4, 2008

(54) EXTENDABLE AND CONTRACTABLE STEERING COLUMN APPARATUS

(75) Inventor: Kou Yamamoto, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/698,490

(22) Filed: Nov. 3, 2003

(65) Prior Publication Data

US 2004/0090058 A1     May 13, 2004

(30) Foreign Application Priority Data

Nov. 5, 2002    (JP)   ............................ 2002-321482

(51) Int. Cl.
*B62D 1/18*    (2006.01)
*B62D 1/184*    (2006.01)
*B62D 1/185*    (2006.01)

(52) U.S. Cl. ........................................ 280/775; 74/493

(58) Field of Classification Search ................ 280/775; 74/493; 403/322.3, 322.4, 322.1, 374.1, 403/374.3, 374.5, 379.1, 379.3, 379.5
See application file for complete search history.

(56) References Cited

U.S. PATENT DOCUMENTS

| | | | | |
|---|---|---|---|---|
| 3,977,692 | A | * | 8/1976 | Findley et al. ............... 280/775 |
| 4,535,645 | A | * | 8/1985 | De Bisschop et al. ......... 74/492 |
| 4,554,843 | A | * | 11/1985 | Andersson .................... 74/493 |
| 4,563,912 | A | * | 1/1986 | Parks ........................... 74/493 |
| 4,890,505 | A | | 1/1990 | Kinoshita et al. |
| 4,893,518 | A | | 1/1990 | Matsumoto et al. |
| 5,152,627 | A | * | 10/1992 | Arnold ..................... 403/109.3 |
| 5,199,319 | A | * | 4/1993 | Fujiu ............................ 74/493 |
| RE34,359 | E | | 8/1993 | Matsumoto et al. |
| 5,361,646 | A | | 11/1994 | Venable |
| 5,363,716 | A | | 11/1994 | Budzik et al. |
| 5,439,252 | A | | 8/1995 | Oxley et al. |
| 5,598,741 | A | | 2/1997 | Mitchell et al. |
| 5,743,150 | A | * | 4/1998 | Fevre et al. ................... 74/493 |
| 5,941,129 | A | | 8/1999 | Anspaugh et al. |
| 5,979,265 | A | | 11/1999 | Kim et al. |

(Continued)

FOREIGN PATENT DOCUMENTS

| | | | |
|---|---|---|---|
| DE | 4029573 | * | 7/1991 |
| JP | 5-178218 | | 7/1993 |
| JP | 5-262238 | | 10/1993 |
| JP | 6-295 | | 1/1994 |
| JP | 2588338 | | 10/1998 |
| JP | 2002-67976 | | 3/2002 |

(Continued)

OTHER PUBLICATIONS

U.S. Appl. No. 10/726,522, filed Dec. 4, 2003 (corresponds to Cite No. 17).

*Primary Examiner*—Paul N. Dickson
*Assistant Examiner*—George D Spisich
(74) *Attorney, Agent, or Firm*—Miles & Stockbridge PC

(57) ABSTRACT

An extendable and contractable steering column apparatus includes an outer column through which an inner column is slidably inserted, a lock housing portion formed on the outer column, and a locking mechanism that includes a pair of movable pieces slidably fitted within a bore formed in the lock housing portion. The locking mechanism shifts the pair of movable pieces toward each other so as to press the inner column and shifts the pair of movable pieces away from each other so as to release the pressure on the inner column, in response to swinging of an operating lever. The cross section of the bore of the lock housing portion is non-circular and the cross sections of said pair of movable pieces are also non-circular correspondingly.

8 Claims, 3 Drawing Sheets

U.S. PATENT DOCUMENTS

| | | |
|---|---|---|
| 6,036,228 A * | 3/2000 | Olgren et al. ............... 280/775 |
| 6,062,101 A | 5/2000 | Higashino |
| 6,092,957 A | 7/2000 | Fevre et al. |
| 6,467,807 B2 | 10/2002 | Ikeda et al. |
| 6,623,036 B2 | 9/2003 | Yamamura et al. |
| 6,659,504 B2 * | 12/2003 | Riefe et al. ................. 280/777 |
| 6,695,349 B2 | 2/2004 | Bohlen et al. |
| 6,799,779 B2 | 10/2004 | Shibayama |
| 6,948,741 B2 | 9/2005 | Manwaring et al. |
| 2004/0113408 A1 | 6/2004 | Yamamoto |

FOREIGN PATENT DOCUMENTS

| | | | |
|---|---|---|---|
| JP | 2002-67977 | | 3/2002 |
| JP | 2002-166835 | * | 6/2002 |
| JP | 2004-155268 | * | 6/2004 |

* cited by examiner

EXTENDABLE AND CONTRACTABLE STEERING COLUMN APPARATUS

This application claims the benefit of Japanese Patent Application No. 2002-321482 which is hereby incorporated by reference.

BACKGROUND OF THE INVENTION

1. Field of the Invention

The present invention relates to a telescopically length adjustable steering column apparatus for adjusting the position of a steering wheel in the length direction of a vehicle by extending and contracting telescopically the whole length of a steering column through which a steering shaft is inserted in accordance with the physical constitution or the position of the driver.

2. Related Background Art

As a steering apparatus for a vehicle, there is a telescopically extendable and contractable steering column apparatus (a so-called telescopic steering column apparatus) for adjusting the position of a steering wheel in the length direction of a vehicle by extending and contracting telescopically the whole length of a steering column, through which a steering shaft is inserted, in accordance with the physical constitution or the position of the driver.

In the apparatus disclosed in Japanese Utility Model Application Laid-Open No. 6-78155 (Japanese Utility Model Registration No. 2588338), a lock housing portion is formed on an outer column through which an inner column is slidably inserted and a pair of movable pieces are fitted in a cylinder bore formed in the lock housing portion. That apparatus is provided with a locking mechanism for shifting the pair of movable pieces toward each other so as to press the inner column and shifting the pair of movable pieces away from each other to release the pressure on the inner column in response to swinging of an operating lever by the driver.

FIG. 4 is a side view showing the lock housing portion of the extendable steering column apparatus disclosed in Japanese Utility Model Application Laid-Open No. 6-78155 (Japanese Utility Model Registration No. 2588338). In this apparatus, the cylinder bore b formed in the lock housing portion a has a circular cross section and the pair of movable pieces c slidably fitted in the cylinder bore also have circular cross sections correspondingly.

However, in the apparatus disclosed in Japanese Utility Model Application Laid-Open No. 6-78155 (Japanese Utility Model Registration No. 2588338), since the lock housing portion a has a circular cross section and the pair of movable pieces c also have circular cross sections, in the case that a torque is exerted on the movable piece c when the operating lever is swung, the movable piece is sometimes rotated.

In the case that the movable pieces c has been rotated due to swinging of the operating lever, the movable piece may bite the inner column at the time of adjustment of the telescopic position.

In addition, in the case that the cross sections of the cylinder bore b and the movable pieces c are circular, the pressing surfaces (or the friction surface) in which the movable pieces c press the inner column are unstable, so that the pressing force (or the holding force) as a frictional force becomes unstable.

SUMMARY OF THE INVENTION

The present invention has been made in view of the above-described situations. An object of the present invention is to avoid rotation of the movable pieces positively so as to prevent the movable pieces from biting the inner column at the time of adjustment of the telescopic position while increasing the surface area in which the movable pieces press the inner column so as to provide an extendable and contractable steering column apparatus in which the pressing force (or the retaining force) is stabilized.

In order to attain the above-described object, an extendable and contractable steering column apparatus according to the present invention includes an outer column through which an inner column is slidably inserted, a lock housing portion formed on the outer column, and a locking mechanism that includes a pair of movable pieces slidably fitted within a bore formed in the lock housing portion to shift the pair of movable pieces toward each other so as to press the inner column and to shift the pair of movable pieces away from each other so as to release the pressure on the inner column, in response to swinging of an operating lever, wherein the cross section of the bore of the lock housing portion is non-circular and the cross sections of said pair of movable pieces are also non-circular correspondingly.

As per the above, according to the present invention, the cross sectional shape of the bore in the lock housing portion is non-circular and the cross sectional shapes of the pair of movable pieces are also non-circular correspondingly. With this feature, rotation of the pair of movable pieces can be avoided reliably even if a torque is exerted on the pair of movable pieces when the operating lever is swung, so that the movable pieces can be prevented from biting the inner column upon adjustment of the telescopic position.

In addition, since the cross sectional shapes of the bore and the movable pieces are non-circular, the area of the pressing surfaces (or friction surfaces) in which the movable pieces press the inner column can be increased. Therefore, the pressing force (i.e. the holding force) as a frictional force can be stabilized.

DESCRIPTION OF THE PREFERRED EMBODIMENT

In the following, a preferred embodiment of the present invention will be described with reference to the accompanying drawings.

Figure 1:
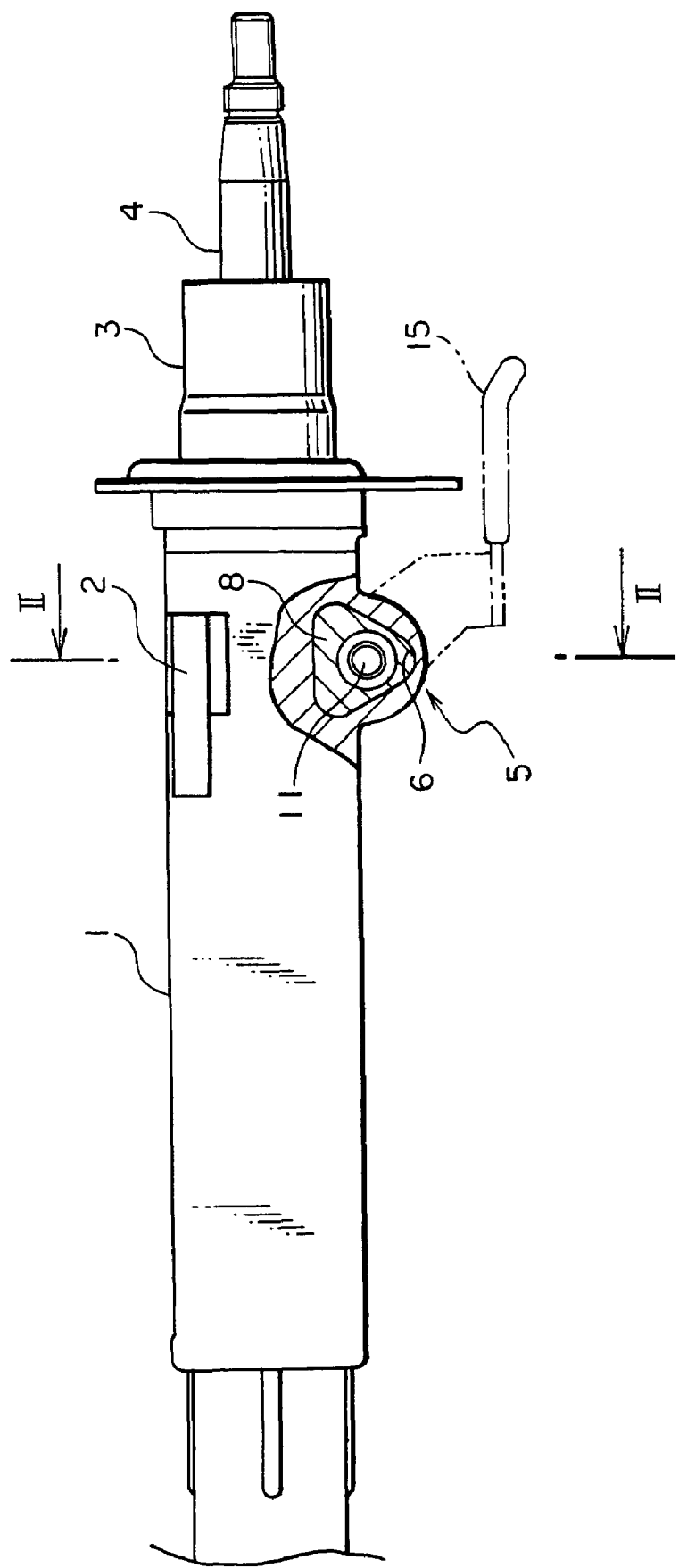
FIG. 1 is a side view showing an extendable steering column apparatus according to an embodiment of the present invention.
Figure 2:
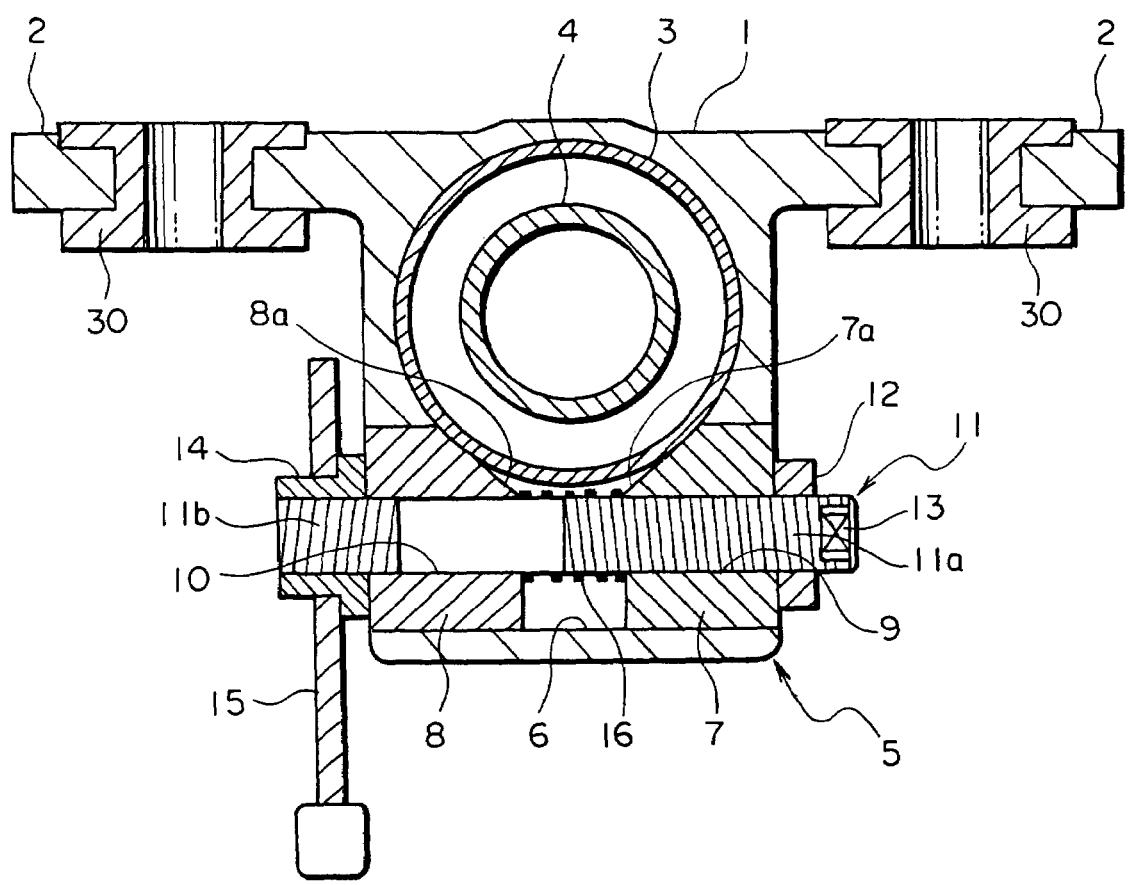
FIG. 2 is a cross sectional view taken along line II-II in FIG. 1.
Figure 3A:
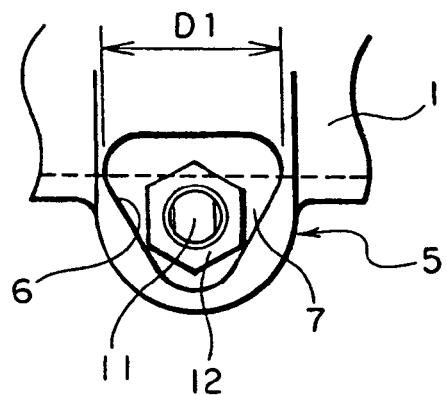
FIG. 3A is an enlarged side view showing a lock housing shown in FIG. 1.
Figure 3B:
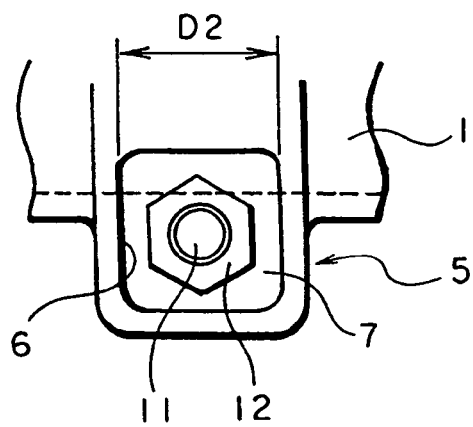
FIG. 3B is an enlarged side view showing a lock housing as an modification of the embodiment of the present invention.

FIG. 1 is a side view showing an extendable steering column apparatus according to an embodiment of the present invention. FIG. 2 is a cross sectional view taken along line II-II in FIG. 1. FIG. 3A is an enlarged side view showing a lock housing shown in FIG. 1. FIG. 3B is an enlarged side view showing a lock housing as an modification of the embodiment of the present invention.

As shown in FIGS. 1 and 2, an outer column 1 is formed as a long tube extending in the axial direction by die cast molding using aluminum or injection molding using a synthetic resin etc. The outer column 1 is supported on the lower portion of the dashboard of a vehicle with integrally molded supporting brackets 2 projecting from both sides of the outer column 1 by means of bolts (not shown) via resin capsules 30.

Inside the outer column 1, there is inserted an inner column 3 in the form of a long tube extending in the axial direction that can slide in the axial direction. A length adjustable, that is, extendable and contractable steering shaft 4 is rotatably supported in the interior of the inner column 3.

A lock housing portion 5 projecting below the outer column 1 is provided on the lower part of the supporting brackets 2. The lock housing portion 5 is integrally molded with the supporting brackets 2. The lock housing portion 5 has a bore 6 extending through the lock housing portion 5 in the width direction of the vehicle.

A first movable piece 7 is inserted in one of the half portions of the bore 6 (the right half in FIG. 2) so that the first movable piece 7 can slide in the bore 6. A first bevel 7a is formed at the upper portion of the first movable piece 7 at a position near the center of the lock housing portion 5 so that the first bevel 7a presses the outer circumferential surface of the inner column 3.

A second movable piece 8 is inserted in the other half portion of the bore 6 (the left half in FIG. 2) so that the second movable piece 8 can slide in the bore 6. A second bevel 8a is formed at the upper portion of the second movable piece 8 at a position near the center so that the second bevel 8a presses the outer circumferential surface of the inner column 3.

The first and second bevels 7a and 8a may be either planar surfaces or curved surfaces that follow the shape of the outer peripheral surface of the inner column 3.

A locking mechanism for the first and second movable pieces 7 and 8 has the following structure. The first movable piece 7 has a threaded screw hole 9 having an internal thread. The second movable piece 8 has a through-hole 10 coaxial with the threaded screw hole 9. A screw rod 11 is inserted through the threaded screw hole 9 of the first movable piece 7 and the through-hole 10 of the second movable piece 8.

The screw rod 11 has a screw portion 11a having an external thread to be threaded in the threaded screw hole 9 at one end and an inverse screw portion 11b having an inverse external thread at the other end. The inverse screw portion 11b has a thread with a relatively large pitch such as a double-start thread.

A lock nut 12 is screwed on the portion of the screw rod 11 at one end thereof that projects beyond the outer surface of the first movable piece 7. The lock nut is tightly secured to the outer surface of the first movable piece 7 so as to retain the screw rod 11 non-rotatable relative to the first movable piece 7. The screw rod has a pair of planar surfaces 13 parallel to each other formed on the outer circumferential surface of the screw rod at the aforementioned end thereof to facilitate the tight securing operation.

A adjusting nut 14 is screwed on the inverse screw portion 11b projecting beyond the outer surface of the second movable piece 8 at the other end of the screw rod 11. A base end portion of an operating lever 15 is connected and fixed to the adjusting nut 14 by welding or the like means.

An compression spring 16 is provided between the first and second movable pieces 7 and 8. The screw rod 11 passes through the compression coil spring 16. With the biasing force of the compression coil spring 16, both the movable pieces are positively spaced apart from each other upon telescopic adjustment of the position of the steering wheel.

The compression coil spring 16 is not essential to this structure, and it may be provided as circumstances demand.

In the extendable and contractable steering column apparatus having the above-described structure, when the operating lever 15 is swung in one direction to rotate the adjusting nut 14 in one direction for attaining securing at the telescopically adjusted position, since the adjusting nut 14 is screwed on the inverse screw portion 11b of the non-rotatable screw rod 11, a tensile force acts on the non-rotatable screw rod 11 toward the left in FIG. 2 by the effect of the feed screw mechanism while a reverse force acts on the adjusting nut 14 toward the right in FIG. 2.

Consequently, the non-rotatable screw rod 11 is shifted toward the left in FIG. 2, which causes the first movable piece 7 to shift toward the left in FIG. 2. On the other hand, the second movable piece 8 is shifted in the right in FIG. 2 by the reverse force of the adjusting nut 14. Thus, the first movable piece 7 and the second movable piece 8 are shifted toward each other, so that the bevels 7a and 8a of both the movable pieces 7 and 8 press the outer peripheral surface of the inner column 3. As a result, securing at the telescopically adjusted position can be attained.

On the other hand, upon telescopically adjusting the position of the steering wheel, the operating lever is swung in the direction reverse to the above to rotate the adjusting nut 14 in the reverse direction. Then, a pressing force toward the right in FIG. 2 acts on the non-rotatable screw rod 11 by the effect of the feed screw while an reaction force toward the left in FIG. 2 acts on the adjusting nut 14.

Consequently, the non-rotatable screw rod 11 is shifted toward the right in FIG. 2 by a tensile force, which causes the first movable piece 7 to shift toward the right in FIG. 2, while the second movable piece 8 is shifted toward the left in FIG. 2 by a reverse force of the inner column 3. Thus, the first movable piece 7 and the second movable piece 8 are shifted away from each other, so that the bevels 7a and 8a of both the movable pieces 7 and 8 are detached from the outer peripheral surface of the inner column 3. In this process, the compression spring 16 facilitates the shifting away movement of the movable pieces 7 and 8. As a result, securing of the telescopic position is released and telescopic adjustment of the position of the steering wheel is allowed.

In this embodiment, as shown in FIGS. 1 and 3A, the cross sectional shape of the bore 6 of the lock housing portion 5 is triangular (that is, non-circular), and the cross sectional shapes of the pair of movable pieces 7 and 8 are also triangular (non-circular) correspondingly.

The shapes of the cross sections of the bore 6 and the movable pieces 7 and 8 need only to be non-circular, and they may be quadrangular as shown in FIG. 3B or other shapes.

With the above-described feature, rotation of the pair of movable pieces 7 and 8 can be avoided reliably even if a torque is exerted on the pair of movable pieces when the operating lever 15 is swung, so that the movable pieces 7 and 8 can be prevented from biting the inner column 3 upon telescopic adjustment of the position of the steering wheel.

In addition, since the cross sectional shapes of the bore 6 and the movable pieces 7 and 8 are non-circular, the area of the pressing surfaces (or friction surfaces) in which the movable pieces 7 and 8 press the inner column can be increased.

Figure 4:
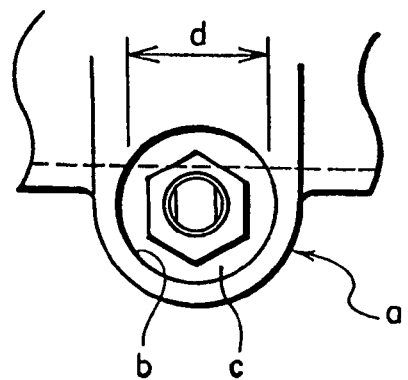
FIG. 4 is an enlarged side view showing a lock housing portion according to a prior art.

Specifically, in the case that the cross sectional shapes of the bore 6 and the movable pieces 7 and 8 are triangular, the axial length of the area in which the movable pieces 7 and 8 are in contact with the inner column is D1 as shown in FIG. 3A, and in the case that the cross sectional shapes are quadrangular, the axial length of the area in which the movable pieces 7 and 8 are in contact with the inner column is D2 as shown in FIG. 3B, while in the case that the cross sectional shapes are circular, the axial length of the area in which the movable pieces 7 and 8 are in contact with the inner column is d as shown in FIG. 4. As will be apparent from those drawings, D1 is larger than d and D2 is larger than d.

Therefore, with the non-circular cross sectional shapes of the bore 6 and the movable pieces 7 and 8, the area of the pressing surfaces (or the friction surfaces) in which the movable pieces 7 and 8 press the inner column 3 can be increased as compared to the case of the circular cross sectional shapes, so that the pressing force (i.e. the holding force) as a frictional force can be stabilized.

The cross sections of the movable pieces may be non-circular such as elliptic. The screw rod and the movable pieces may be arranged above the inner column.

It should be noted that the present invention is not limited to the details of the above-described embodiment and various modifications can be made to the embodiment. For example, while the above description of the embodiment has been made in connection with the telescopically length adjustable steering column, the present invention can also be applied to the tilt adjustable and telescopically length adjustable steering column.

As per the above, according to the present invention, the cross sectional shape of the bore in the lock housing portion is non-circular and the cross sectional shapes of the pair of movable pieces are also non-circular correspondingly. With this feature, rotation of the pair of movable pieces can be avoided reliably even if a torque is exerted on the pair of movable pieces when the operating lever is swung, so that the movable pieces can be prevented from biting the inner column upon the telescopic adjustment of the position of the steering wheel.

In addition, since the cross sectional shapes of the bore and the movable pieces are non-circular, the area of the pressing surfaces (or friction surfaces) in which the movable pieces press the inner column can be increased. Therefore, the pressing force (i.e. the holding force) as a frictional force can be stabilized.

What is claimed is:

1. An extendable and contractable steering column apparatus for a vehicle including an outer column through which an inner column is slidably inserted, a lock housing portion formed on the outer column, and a locking mechanism that includes a pair of movable pieces slidably fitted within a bore formed through the lock housing portion in a vehicle body widthwise direction, a screw rod passing through said pair of movable pieces, and an operation lever disposed at an end portion of the screw rod,
    wherein said pair of movable pieces is shifted toward each other so as to press said inner column and away from each other so as to release the pressure on said inner column, in response to swinging of said operating lever,
    wherein a cross section of the bore of the lock housing portion is non-circular and cross sections of said pair of movable pieces are also non-circular correspondingly, and
    wherein a respective surface portion of each of said pair of movable pieces in contact with said inner column has a length, in an axial direction of said steering column, that is greater than or equal to a cross dimension of said bore in a plane containing an axis of said screw rod and parallel to an axis of said steering column.

2. An extendable and contractable steering column apparatus according to claim 1, wherein said lock housing is integrally molded with said outer column.

3. An extendable and contractable steering column apparatus according to claim 1, wherein said outer column is formed of die cast molded aluminum.

4. An extendable and contractable steering column apparatus according to claim 1,
    wherein each of said surface portions is of greater axial length than said cross dimension of said bore.

5. An extendable and contractable steering column apparatus according to claim 1,
    wherein the cross sections of said bore and said pair of movable pieces are generally triangular.

6. An extendable and contractable steering column apparatus for a vehicle including an outer column through which an inner column is slidably inserted, a lock housing portion formed on the outer column, and a locking mechanism that includes a pair of movable pieces slidably fitted within a bore formed through the lock housing portion in a vehicle body widthwise direction, a screw rod passing through said pair of movable pieces, and an operation lever disposed at an end portion of the screw rod,
    wherein said pair of movable pieces is shifted toward each other so as to press said inner column and away from each other so as to release the pressure on said inner column, in response to swinging of said operating lever,
    wherein a cross section of the bore of the lock housing is polygonal and cross sections of said pair of movable pieces are also polygonal correspondingly,
    wherein respective peripheral surfaces forming the polygonal cross section of each of said bore and said movable pieces include at least a surface which is parallel to an axis of the screw rod, and
    wherein a respective surface portion of each of said pair of movable pieces in contact with said inner column has a length, in an axial direction of said steering column, that is greater than or equal to a cross dimension of said bore in a plane containing an axis of said screw rod and parallel to an axis of said steering column.

7. An extendable and contractable steering column apparatus according to claim 6,
    wherein the respective peripheral surfaces forming the polygonal cross section of each of said bore and said movable pieces, are all flat and parallel to an axis of the screw rod.

8. An extendable and contractable steering column apparatus according to claim 6,
    wherein each of said surface portions is of greater axial length than said cross dimension of said bore.

* * * * *